Patented Nov. 27, 1928.

1,693,448

UNITED STATES PATENT OFFICE.

HANS KRZIKALLA, OF MANNHEIM, AND WERNER MÜLLER, OF LUDWIGSHAFEN-ON-THE-RHINE, GERMANY, ASSIGNORS TO GRASSELLI DYESTUFF CORPORATION, OF NEW YORK, N. Y., A CORPORATION OF DELAWARE.

PRODUCTION OF METALLIC COMPOUNDS OF DYESTUFFS.

No Drawing. Application filed April 1, 1927, Serial No. 180,334, and in Germany June 15, 1926.

If dyestuffs, which are capable of forming complex metallic compounds but are difficultly soluble or insoluble in water, be treated with aqueous solutions of suitable metallic compounds, the complex metallic compounds are formed only in a very incomplete manner, if at all.

We have now found that the formation of the complex metallic compounds of the dyestuffs takes place very smoothly and completely when the reaction is allowed to take place in the presence of such organic solvents, as are more or less readily soluble in water under the prevailing conditions and are capable of dissolving the dyestuffs. In other respects, the action of the metallic compounds on the dyestuffs may take place in any convenient manner, as for example, with or without the application of pressure and the like. Typical solvents for use according to this invention are mono- or poly- valent alcohols, such as methyl-, ethyl-, propyl-, butyl- alcohols, and the like, glycol and its ethers or esters, polyglycol and glycerol; also ethylene-chlorhydrin, triethanolamine, thiodiglycol, phenols, acetone and other ketones, and the like. Mixtures of organic solvents may also be employed.

The following examples will further illustrate how the said invention may be carried into practical effect but the invention is not limited thereto.

Example 1.

28 parts by weight of the azo dyestuff obtainable from the diazo compound of p-chloro-aminophenol and β-naphthol are heated in an autoclave with about 400 parts by volume of ethyl alcohol and 120 parts by weight of an aqueous solution containing 7.6 parts of chromic oxid and 13.5 parts by weight of 85 per cent formic acid, for about 3 hours at 120° C. The resulting, partially dissolved dyestuff is precipitated by the addition of water, or by distilling off the alcohol, and is filtered by suction and washed. On drying, a violet dyestuff is obtained, the alcoholic solution of which does not change color on the addition of alkali. If an attempt be made to produce the same chromiferous dyestuff in water, under otherwise equal conditions, a large proportion of the original dyestuff remains unaltered.

The corresponding copper compound may be prepared, in a similar manner, with copper formate. The ethyl alcohol may also be replaced by acetone.

Example 2.

32 parts by weight of the azo dyestuff obtainable from the diazo compound of p-chloro-aminophenol and 3-methyl-1-phenyl-5-pyrazolone are heated at 120° C. in an autoclave, for about 3 to 4 hours, with 400 parts by volume of ethyl alcohol and the same solution of chromium formate as specified in Example 1. The red chromium compound of the dyestuff is obtained on adding water to the reaction mixture.

A mixture of methyl- and benzyl-alcohol for example, may be substituted for the ethyl alcohol in carrying out the process.

We claim:

1. The process of producing metallic compounds of such dyestuffs as are difficultly soluble in water which consists in treating such a dyestuff with an aqueous solution of a metallic compound capable of reacting therewith in the presence of an organic solvent capable of dissolving the dyestuff and miscible with water.

2. The process of producing metallic compounds of such dyestuffs as are difficultly soluble in water which consists in treating such a dyestuff with an aqueous solution of a metallic compound capable of reacting therewith in the presence of a water-soluble aliphatic alcohol.

3. The process of producing chromium compounds of such dyestuffs as are difficultly soluble in water which consists in treating such a dyestuff with an aqueous solution of a chromium compound capable of reacting therewith in the presence of an organic solvent capable of dissolving the dyestuff and miscible with water.

In testimony whereof we have hereunto set our hands.

HANS KRZIKALLA.
WERNER MÜLLER.